US012798529B2

(12) United States Patent
Möller et al.

(10) Patent No.: US 12,798,529 B2
(45) Date of Patent: Nov. 17, 2026

(54) METHOD OF DETERMINING ACTUATOR BRAKE TORQUE LIMITS

(71) Applicant: Volvo Truck Corporation, Gothenburg (SE)

(72) Inventors: Daniel Möller, Gothenburg (SE); Johan Hansson, Gothenburg (SE); Leo Laine, Gothenburg (SE); Esteban Gelso, Västra Frölunda (SE); Robert Hjelte Ulmehag, Gothenburg (SE); Jonas Fredriksson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/866,531

(22) PCT Filed: May 23, 2022

(86) PCT No.: PCT/EP2022/063879
§ 371 (c)(1),
(2) Date: Nov. 16, 2024

(87) PCT Pub. No.: WO2023/227191
PCT Pub. Date: Nov. 30, 2023

(65) Prior Publication Data

US 2025/0065852 A1 Feb. 27, 2025

(51) Int. Cl.
*B60T 8/172* (2006.01)
*B60T 13/58* (2006.01)

(52) U.S. Cl.
CPC ............ *B60T 8/172* (2013.01); *B60T 13/586* (2013.01); *B60T 2210/12* (2013.01)

(58) Field of Classification Search
CPC .... B60T 8/172; B60T 2210/12; B60T 13/566; B60L 13/566
See application file for complete search history.

(56) References Cited

U.S. PATENT DOCUMENTS 5,205,622 A * 4/1993 Gee .......................... B60T 8/175 303/113.5
5,615,933 A * 4/1997 Kidston .................... B60T 1/10 303/3
(Continued)

FOREIGN PATENT DOCUMENTS

DE 102011111589 A1 2/2013
DE 102014017464 A1 5/2016
(Continued)

OTHER PUBLICATIONS

International Search Report and Written Opinion for International Patent Application No. PCT/EP2022/063879, mailed Jan. 30, 2023, 14 pages.

*Primary Examiner* — Logan M Kraft
*Assistant Examiner* — Joshua Campbell
(74) *Attorney, Agent, or Firm* — Withrow & Terranova, PLLC

(57) ABSTRACT

A method of determining actuator brake torque limits for a plurality of actuators, wherein each actuator is operable to apply a brake torque on a wheel of a vehicle, the method comprising determining, for each actuator, an actuator brake torque capability range based on an actuator specific torque capacity and a current operational state of the actuator; determining, for each wheel of the vehicle, a road condition brake torque capability range based on an estimated lateral wheel force acting on the wheel, an estimated friction between a tire surface of the wheel and a road surface, and a vertical wheel force acting on the wheel; and determining, for each actuator, an upper actuator brake torque limit and a lower actuator brake torque limit based on the actuator brake torque capability range and the road condition brake torque capability range.

17 Claims, 4 Drawing Sheets

(56) References Cited

U.S. PATENT DOCUMENTS

| | | | | |
|---|---|---|---|---|
| 6,450,587 | B1 * | 9/2002 | MacGregor | B60T 17/16 |
| 11,230,288 | B1 | 1/2022 | Tokarz et al. | |
| 2002/0111752 | A1 * | 8/2002 | Nakamura | G01N 19/02 702/42 |
| 2005/0012501 | A1 * | 1/2005 | Isono | B60T 8/172 324/300 |
| 2005/0052075 | A1 * | 3/2005 | Sabelstrom | B60T 13/662 303/3 |
| 2006/0076840 | A1 | 4/2006 | Yamaguchi et al. | |
| 2008/0156086 | A1 * | 7/2008 | Bertrand | B60W 40/068 73/146 |
| 2010/0250083 | A1 * | 9/2010 | Takahashi | B60W 10/18 701/70 |
| 2014/0257664 | A1 * | 9/2014 | Arbitmann | B60T 8/17551 701/71 |
| 2018/0361856 | A1 * | 12/2018 | Zhao | B60W 10/02 |

FOREIGN PATENT DOCUMENTS

| | | | |
|---|---|---|---|
| EP | 2876014 | A1 | 5/2015 |
| WO | 2021074274 | A1 | 4/2021 |
| WO | 2021144008 | A1 | 7/2021 |

* cited by examiner

METHOD OF DETERMINING ACTUATOR BRAKE TORQUE LIMITS

This application is a 35 USC 371 national phase filing of International Application No. PCT/EP2022/063879, filed May 23, 2022, the disclosure of which is incorporated herein by reference in its entirety.

TECHNICAL FIELD

The present invention relates to a method of determining actuator brake torque limits for a plurality of actuators. The invention also relates to a vehicle motion management system connectable to a plurality of actuators. Although the invention will mainly be directed to a vehicle in the form of a truck, the invention may also be applicable for other types of vehicles comprising actuators operable to apply a brake torque on a wheel of the vehicle, such as e.g., buses, working machines, trailers, and other transportation vehicles.

BACKGROUND

Electrified propulsion of passenger cars is becoming a conventional solution to reduce the environmental effect caused by vehicles. Heavy-duty vehicles, such as trucks, are also continuously developed to be able to provide electrified propulsion. The electrified propulsion system comprises one or more electric machines operable to generate a propulsion torque on one or more wheels of the vehicle. However, a truck is heavy and the need for relatively large batteries is required to enable for an acceptable distance capacity until having to re-charge the battery.

The electrified vehicles also conventionally comprise foundation brakes, also commonly referred to as service brakes, to secure that the vehicle speed can be reduced as desired. The foundation brakes can be based on friction for its operation and may e.g. be formed as disc brakes or drum brakes which are highly efficient in generating braking torque.

In order to regenerate as much electric power as possible, there is a desire to control the vehicle speed, i.e. the braking operation, by using the electric machine to regenerate electric power. However, solely braking the vehicle speed using the electric machine may not at all times be sufficient, and the foundation brakes must intervene, i.e. to provide a brake blending action. The friction brakes may, however, if used too intensively, be exposed to a phenomenon referred to as brake fading, which is why friction brakes are not suitable for prolonged periods of use that may, e.g., occur when driving downhill for an extended period of time. Brake fading is caused by a build-up of heat in the braking surfaces and leads to significantly reduced braking capability.

It is therefore a desire to improve the braking action of the vehicles, especially to properly determine the torque limits for the various types of brakes, to thereby brake the vehicle by using the electric machine to a greater extent.

SUMMARY

It is thus an object of the present invention to at least partially overcome the above described deficiencies.

According to a first aspect, there is provided a method of determining actuator brake torque limits for a plurality of actuators, wherein each actuator is operable to apply a brake torque on a wheel of a vehicle, the method comprising determining, for each actuator, an actuator brake torque capability range based on an actuator specific torque capacity and a current operational state of the actuator; determining, for each wheel of the vehicle, a road condition brake torque capability range based on an estimated lateral wheel force acting on the wheel, an estimated friction between a tire surface of the wheel and a road surface, and a vertical wheel force acting on the wheel; and determining, for each actuator, an upper actuator brake torque limit and a lower actuator brake torque limit based on the actuator brake torque capability range and the road condition brake torque capability range.

In the following and throughout the entire description, the range limits are defined according to its minimum and maximum as absolute values. When comparing an upper limit with a lower limit, the upper limit is the value furthest away from zero, while the lower limit is the value closest to zero. A brake torque is in itself a negative value so upper and lower limits should be in the following be construed as absolute values.

Further, the actuator brake torque capability range should be construed as relating to the dynamics of the actuator, i.e. the brake torque range that an actuator is able to deliver based on the current operational state of the specific actuator. The road condition brake torque capability range on the other hand relates to brake torque range obtainable based on the friction between the tire surface of the wheel and the road surface operable by the vehicle. As defined above, the friction is an estimated parameter. This estimation may come from e.g. a camera and/or an ambient temperature measurement, etc. Other friction estimation techniques are also conceivable and applicable by the skilled person. The lateral wheel force is, as described above, also an estimated parameter and an example embodiment of such estimation is described in further detail below. According to an example embodiment the road condition brake torque capability range may be further based on a wheel radius of the wheel.

Moreover, the actuator specific torque capacity should be construed as hardware related. Thus, different actuators have different torque capacity, and the actuator specific torque capacity is an indication of how much torque the specific actuator is able to provide during braking. The actuator specific torque capacity is thus a device specification for the actuator.

The present invention is based on the insight that by determining an upper and a lower brake torque limit for each actuator based on the actuator brake torque capability range and the road condition brake torque capability range, a signal can be transmitted to a control allocator of the vehicle such that, when the control allocator assigns a brake torque for the various actuators available. The control allocator can hereby prioritize to assign a majority of the brake torque on an actuator in the form of an electric machine, without exceeding the brake torque limits for such electric machine at its current operational state. This will increase the electric power generated during braking which in turn will increase the operational driving distance of the vehicle. The signal transmitted to the control allocator will also reduce the risk of e.g. overheating the actuators during braking and/or reduce the risk of assigning a brake torque having a magnitude that falls outside the upper and lower brake torque limits. The control allocator will thus be able to assign a total brake torque to the plurality of actuators which satisfies an overall brake demand.

According to an example embodiment, the current operational state of the actuator may be a brake torque level currently applied by the actuator. Accordingly, based on the current brake torque level obtained by the actuator, the capability range of the actuator can be determined. The current brake torque level obtained by the actuator presents an indication of how much additional brake torque the actuator is able to provide.

According to an example embodiment, method may further comprise determining, for each wheel of the vehicle, a wheel slip value, and estimating the lateral wheel force based on a mapping model defining a relationship between wheel slip and lateral wheel force.

The mapping model is preferably based on a predetermined characteristic value of the at least one wheel. The mapping model defines a relationship between wheel force and wheel slip. The wheel slip can also be recalculated to a wheel speed, where the wheel speed can be defined relative to the ground, and normalized, i.e. the wheel slip, or be defined as an absolute rotational velocity. Thus, when defining a mapping model, a lateral wheel force value for a specific wheel speed or wheel slip value can be obtained.

The mapping model can be a fixed mapping model, and/or a mapping model comprising estimated characteristics of the relationship between the wheel forces and the wheel slip values. As another alternative, the mapping model could be parameterized based on other factors, such as normal load on the tire, type of tire, wear, friction, etc.

By estimating the lateral wheel force based on the mapping model, a characteristic of the lateral wheel force can be properly estimated, i.e. the estimation can be determined reliable.

The lateral wheel force can alternatively be estimated by vehicle states and road conditions, or measured.

According to an example embodiment, the plurality of actuators may comprise a first foundation brake operable to apply a brake torque on a first wheel, a second foundation brake operable to apply a brake torque on a second wheel, a third foundation brake operable to apply a brake torque on a third wheel, a fourth foundation brake operable to apply a brake torque on a fourth wheel, and an electric machine operable to apply a brake torque on the third and fourth wheels.

The first and second wheels are preferably a pair of front steerable wheels of the vehicle, while the third and fourth wheels are a pair of rear wheels of the vehicle. In such situation, the pair of front steerable wheels are provided with foundation brakes while the pair of rear wheels are provided with foundation brakes as well as at least one electric machine for controlling braking. According to an example embodiment, the electric machine may be connected to the third and fourth wheel via differential coupling. One single electric machine is hereby propelling and breaking the rear pair of wheels.

The current operational state of an electric machine may, for example, relate to a current state of charge (SOC) level a vehicle energy storage system. Put it differently, the SOC level can be set as an indicator of how much brake torque the electric machine is able to provide.

According to an example embodiment, the upper actuator brake torque limit for each of the first and second foundation brakes may be a minimum of an upper limit of the actuator brake torque capability range and an upper limit of the road condition brake torque capability range, and wherein the lower actuator brake torque limit for each of the first and second foundation brakes may be a lower limit of the actuator brake torque capability range.

Hereby, it is assured that the actuator brake torque limits of the first and second foundation brakes are not exceeded.

According to an example embodiment, the upper actuator brake torque limit for the electric machine may be a minimum of an upper limit of the actuator brake torque capability range, and a brake torque corresponding to twice of the lowest one of the upper limit of the road condition brake torque capability range for the third and fourth wheels, and wherein the lower actuator brake torque limit for the electric machine may be a lower limit of the actuator brake torque capability range.

The actuator brake torque limits of the electric machine are hereby efficiently determined.

According to an example embodiment, the upper actuator brake torque limit for each of the third and fourth foundation brakes may be a minimum of an upper limit of the actuator brake torque capability range and an upper limit of the road condition brake torque capability range minus the upper actuator brake torque limit for the electric machine, and wherein the lower actuator brake torque limit for each of the third and fourth foundation brakes may be a lower limit of the actuator brake torque capability range.

According to an example embodiment, the method may further comprise receiving a signal indicative of a requested brake torque for decelerating the vehicle; and determining a desired brake torque for the electric machine as a minimum of the requested brake torque and the upper actuator brake torque limit for the electric machine.

Hereby, the electric machine is used to its maximum during braking, either to absorb all brake torque, i.e. the requested brake torque or, if the requested brake torque exceeds the upper actuator limit for the electric machine, set the desired brake torque of the electric machine to its upper brake torque limit.

According to an example embodiment, the method may further comprise determining a desired brake torque for each of the third and fourth foundation brakes based on the requested torque, the desired brake torque of the electric machine and the upper actuator brake torque limit for each of the third and fourth foundation brakes. The overall brake torque of the foundation brakes for the third and fourth wheels is hereby determined.

According to an example embodiment, the method may further comprise determining a desired brake torque for each of the first and second foundation brakes based on the requested torque, the desired brake torque of the electric machine, the desired brake torque for each of the third and fourth foundation brakes and upper actuator brake torque limit for each of the first and second foundation brakes. The foundation brakes of the first and second wheels hereby absorbs the remaining part of the brake request, if needed.

According to an example embodiment, the method may further comprise determining a first wheel axle pressure level exposed to a first wheel axle connected to the first and second wheels, determining a second wheel axle pressure level exposed to a second wheel axle connected to the third and fourth wheels, and determining the desired brake torque for each of the first and second foundation brakes also based on a pressure ratio between the first and second wheel axle pressure levels.

Hereby, a ratio of the wheel axle pressure between the front and rear wheel axles is determined.

According to an example embodiment, the method may further comprise comparing the torque request with the desired brake torque for the electric machine and the desired brake torque for each of the first, second, third and fourth foundation brakes, and when the torque request exceeds the desired brake torque for the electric machine and the desired brake torque for each of the first, second, third and fourth foundation brakes: determining an updated desired brake torque for each of the third and fourth foundation brakes based on the requested torque, the desired brake torque of the electric machine, the desired brake torque for each of the first and second foundation brakes, and the upper actuator brake torque limit for each of the third and fourth foundation brakes.

Hereby, in a situation where the desired brake torque exceeds the brake torque absorbed by the first to fourth foundation brakes as well as the brake torque absorbed by the electric machine, the remaining brake torque is absorbed by the third and fourth foundation brakes.

According to a second aspect, there is provided a vehicle motion management system for a vehicle, the vehicle motion management system being connectable to a plurality of actuators operable to apply a brake torque on a wheel of a vehicle, the vehicle motion management system comprising processing circuitry configured to determine, for each actuator, an actuator brake torque capability range based on an actuator specific torque capacity and a current operational state of the actuator; determine, for each wheel of the vehicle, a road condition brake torque capability range based on an estimated lateral wheel force acting on the wheel, an estimated friction between a tire surface of the wheel and a road surface, and a vertical wheel force acting on the wheel; and determine, for each actuator, an upper actuator brake torque limit and a lower actuator brake torque limit based on the actuator brake torque capability range and the road condition brake torque capability range.

Effects and features of the second aspect are largely analogous to those described above in relation to the first aspect.

According to a third aspect, there is provided a computer program comprising program code means for performing the steps of any one of the embodiments described above in relation to the first aspect when the program is run on a computer.

According to a fourth aspect, there is provided a computer readable medium carrying a computer program comprising program means for performing the steps of any one of the embodiments described above in relation to the first aspect when the program means is run on a computer.

Effects and features of the third and fourth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
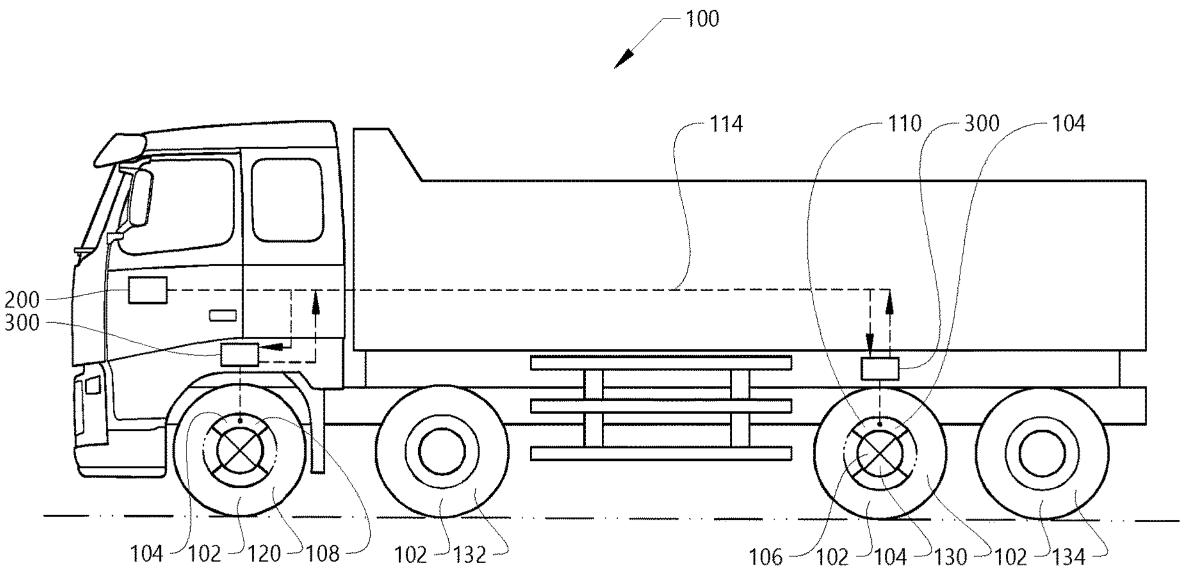
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 100 in the form of a truck. The vehicle comprises a plurality of wheels 102. In particular, the vehicle 100 comprises a pair of front wheels 120 also referred to as the first and second wheels, a pair of rear wheels 130 also referred to as the third and fourth wheels. The exemplified vehicle 100 also comprises a pair of wheels 132 arranged between the pair of front wheels 120 and the pair of rear wheels 130, as well as a pair of wheels 134 arranged behind the pair of rear wheels 130. The following description will focus on describing the invention in relation to the pair of front wheels 120 and the pair of rear wheels 130, although the invention is applicable for actuators of the other wheels as well.

As exemplified in FIG. 1, the pair of front wheels 120 and the pair of rear wheels 130 each comprises at least one actuator 104. In particular, the first and second wheels of the pair of front wheels 120 each comprises actuators 104 in the form of a first and a second foundation brake, of which only the first foundation brake 108 is illustrated. The second and third wheels of the pair of rear wheels 130 each comprises actuators 104 in the form of a third and a fourth foundation brake, of which only the third foundation brake 110 is illustrated. The vehicle 100 also comprises an actuator 104 in the form of an electric machine 106. The electric machine 106 is exemplified in FIG. 1 as being operable to apply a propulsion torque as well as a brake torque on the pair of rear wheels 130. The electric machine 106 is preferably connected to the third and fourth wheels via a differential coupling, i.e. a single electric machine 106 is used for propelling and braking the pair of rear wheels 130. However, the invention is also applicable by the use of so-called wheel hub motors, wherein each one of the third and fourth wheels is provided with an individual electric machine for controlling propulsion and braking.

The electric machine 106 is thus arranged to e.g. provide a tire force to the wheel(s) of the vehicle 100. The electric machine 106 may thus be adapted to generate a propulsion torque as well as arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the actuators 104 is connected to a respective motion support system 300 arranged for controlling operation of the actuator 104. The motion support system 300 is preferably a decentralized motion support system 300, although centralized implementations are also possible. It is furthermore appreciated that some parts of the motion support system may be implemented with processing circuitry remote from the vehicle, such as on a remote server accessible from the vehicle via wireless link. Still further, each motion support system 300 is connected to a vehicle motion management system 200 of the vehicle 100 via a data bus communication arrangement 114 or the like. Hereby, control signals can be transmitted between the vehicle motion management system 200 and the motion support system 300. Portions of the vehicle motion management system 200 will be described in further detail below with reference to FIG. 2.

The vehicle 100 optionally comprises a wireless communications transceiver arranged to establish a radio link to a wireless network comprising a remote server. This way the control unit may access the remote servers for uploading and downloading data. Notably, the vehicle 100 may store measurement data such as amounts of regenerated energy by the electric machines 106 at various geographical locations an along different vehicle routes in local memory or at the remote server. The vehicle motion management system 200 may also query the remote server for information about previously experienced amounts of regenerated energy, and/or temperature increases in various vehicle components along a given route.

The vehicle motion management system 200 may furthermore be arranged to obtain data indicative of an expected rolling resistance for a given route, either from manual configuration or remotely from the remote server. The rolling resistance of the vehicle 100 will affect the energy consumption of the vehicle as it traverses a route. For instance, a gravel road is likely to require more energy compared to a smoother asphalt freeway. Also, friction and air resistance will reduce the requirements on generating negative torque during downhill driving.

The vehicle motion management system 200 as well as the motion support system 300 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device.

Figure 2:
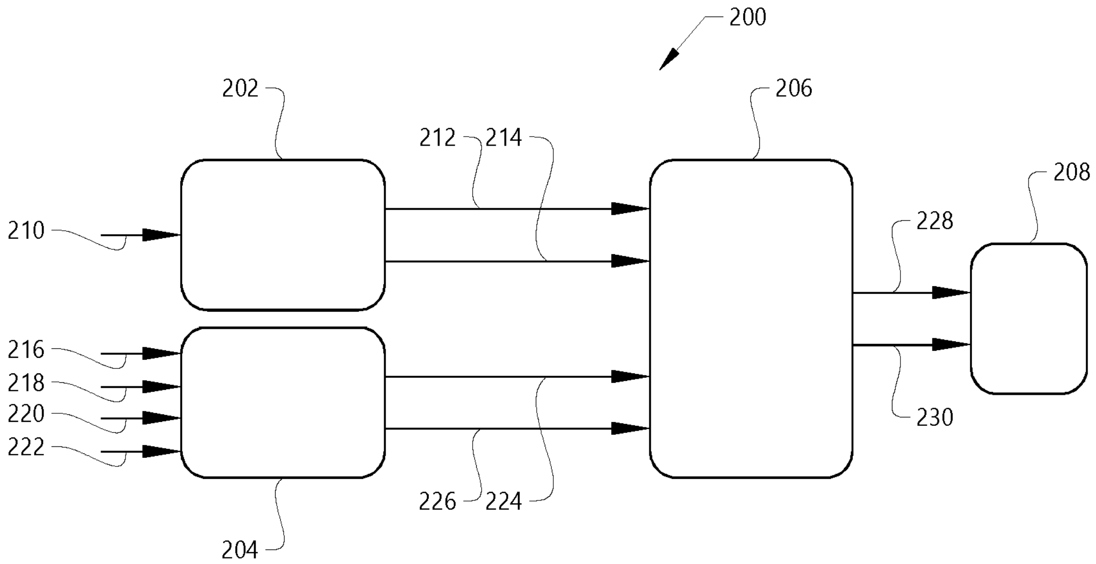
FIG. 2 is a schematic illustration of a vehicle motion management system according to an example embodiment.

As indicated above, the vehicle motion management system 200 is configured to transmit control signals to the motion support systems 300. In further detail, a control allocator of the vehicle motion management system 200 determines a brake torque level to be applied by the various actuators 104 based on a torque request received by the vehicle motion management system 200 in order to obtain a desired braking action by the vehicle 100. Put it differently, the vehicle motion management system 200 determines actuator brake torque limits for each of the actuators 104, and based on the determined actuator brake torque limits, the control allocator determines an optimized brake torque distribution to generate a desired braking action while at the same time generate as much electric power as possible by energy recuperation of the electric machine 106. A signal is thereafter transmitted to each of the motion support systems 300, which signal is indicative of a torque level to be applied by the actuators of each motion support system 300. Reference is now made to FIG. 2 in order to describe parts of the vehicle motion management system 200 of which actuator brake torque limits are determined for each of the actuator 104 controlled by a respective motion support system 300.

FIG. 2 is a schematic illustration of portions of the vehicle motion management system 200 according to an example embodiment. In particular, the FIG. 2 exemplified vehicle motion management system 200 comprises an actuator capability module 202, a road condition capability module 204, an actuator limit module 206 and the above described control allocator 208.

The actuator capability module 202 is configured to determine, on an actuator level, i.e. for each of the actuators 104, an actuator brake torque capability range. The actuator brake torque capability range is based on an actuator specific torque capacity and a current operational state of the actuator 210. The actuator specific torque capacity is hardware related and specifies how much torque a specific actuator 104 is able to provide during braking. The current operational state of the actuator on the other hand is an indication of a brake torque level currently applied by the actuator 104. Once determining the actuator brake torque capability range, the actuator capability module 202 transmits a signal indicative of an upper limit 212 of the actuator brake torque capability range and a lower limit 214 of the actuator brake torque capability range to the actuator limit module 206.

The road condition capability module 204 is configured to determine, on a wheel level, i.e. for each of the wheels provided with an actuator 104, a road condition brake torque capability range. The road condition brake torque capability range hereby determines the wheel forces available in a longitudinal direction to find a brake torque range that can be applied by the actuators 104 on a respective wheel without exceeding friction limitations. The road condition brake torque capability range is based on an estimated lateral wheel force 216 acting on the wheel 102, an estimated friction 218 between a tire surface of the wheel 102 and a road surface, and a vertical wheel force 220 acting on the wheel 102. A detailed example of how to estimate the lateral wheel force 216 will be given below with reference to FIG. 3. The friction 218 between a tire surface of the wheel 102 and a road surface can be determined by e.g. a camera and a measured temperature. As exemplified in FIG. 2, the road condition brake torque capability range may advantageously also be based on a wheel radius of the wheel 102. Once determining the road condition brake torque capability range, the road condition capability module 204 transmits a signal indicative of an upper limit 224 of the road condition brake torque capability range and a lower limit 226 of the road condition brake torque capability range to the actuator limit module 206.

Upon receiving the signals from the actuator capability module 202 and the road condition capability module 204, the actuator limit module 206 determines an upper actuator brake torque limit 228 and a lower actuator brake torque limit 230 for each actuator 104. Thus, the upper 228 and lower 230 actuator brake torque limits are based on the actuator brake torque capability range and the road condition brake torque capability range, which will be exemplified in further detail below. The upper 228 and lower 230 actuator brake torque limits are thereafter transmitted to the control allocator 208 which, based on a received brake torque request, allocates a brake torque for each of the actuators 104 and transmits a signal to each of the actuator control systems 300, whereby each actuator control system 300 controls its actuator 104 accordingly.

The following will now present detailed examples describing how to determine upper 228 and lower 230 actuator brake torque limits for the different actuators 104 exemplified in FIG. 1. Moreover, and to simplify for the reader, the following definitions are made regarding the actuator brake torque capability range and the road condition brake torque capability range for the different actuators 104, the upper limit 212 of the actuator brake torque capability range is also referred to as $actuator_{max}$ and the lower limit 214 of the actuator brake torque capability range is also referred to as $actuator_{min}$. The upper limit 224 of the road condition brake torque capability range is also referred to as $T_{max}$ and the lower limit 226 of the road condition brake torque capability range is also referred to as $T_{min}$. Also, the limit values will be indexed with reference to their respective actuator according to:

Index fl=the first wheel, i.e. front left wheel,

Index fr=the second wheel, i.e. the front right wheel,

Index rl=the third wheel, i.e. rear left,

Index rr=the fourth wheel, i.e. rear right, and

Index em=the electric machine.

The maximum brake torque, $T_{max}$, that can be applied by the actuators 104 on a respective wheel without exceeding friction limitations can be calculated according to eq. (1) below.

$$T_{max} = R_w\sqrt{(\mu F_z)^2 - F_y^2} \tag{1}$$

Where:

$R_w$ is the wheel radius,

μ is the estimated friction 218 between a tire surface of the wheel 102 and a road surface, $F_z$ is the vertical wheel force 220 acting on the wheel 102, and $F_y$ is the estimated lateral wheel force 216 acting on the wheel 102.

Moreover, the upper 228 and lower 230 actuator brake torque limits, in the following also referred to as $$u_{max}^{fl} \text{ and } u_{min}^{fl},$$

for the first foundation brake 104, i.e. the foundation brake acting on the front left wheel, can be determined according to eq. (2) and (3):

$$u_{max}^{fl} = \min(\text{actuator}_{max}^{fl}, T_{max}^{fl}) \tag{2}$$

$$u_{min}^{fl} = \text{actuator}_{min}^{fl} \tag{3}$$

The upper 228 and lower 230 actuator brake torque limits, in the following also referred to as $$u_{max}^{fr} \text{ and } u_{min}^{fr},$$

for the second foundation brake 104, i.e. the foundation brake acting on the front right wheel, can be determined according to eq. (4) and (5):

$$u_{max}^{fr} = \min(\text{actuator}_{max}^{fr}, T_{max}^{fr}) \tag{4}$$

$$u_{min}^{fr} = \text{actuator}_{min}^{fr} \tag{5}$$

Moreover, the upper 228 and lower 230 actuator brake torque limits, in the following also referred to as $$u_{max}^{em} \text{ and } u_{min}^{em},$$

for the electric machine can be determined according to eq. (6) and (7):

$$u_{max}^{em} = \min(\text{actuator}_{max}^{em}, 2 * \min(T_{max}^{rl}, T_{max}^{rr})) \tag{6}$$

$$u_{min}^{em} = \text{actuator}_{min}^{em} \tag{7}$$

Where $$T_{max}^{rl} \text{ and } T_{max}^{rr}$$

is determined for each of the rear left wheel and rear right wheel from eq. (1).

Furthermore, the upper 228 and lower 230 actuator brake torque limits, in the following also referred to as $$u_{max}^{rl} \text{ and } u_{min}^{rl},$$

for the third foundation brake 104, i.e. the foundation brake acting on the rear left wheel, can be determined according to eq. (8) and (9):

$$u_{max}^{rl} = \min(\text{actuator}_{max}^{rl}, T_{max}^{rl} - u_{max}^{em}/2) \tag{8}$$

$$u_{min}^{rl} = \text{actuator}_{min}^{rl} \tag{9}$$

In a similar vein, the upper 228 and lower 230 actuator brake torque limits, in the following also referred to as $$u_{max}^{rr} \text{ and } u_{min}^{rr},$$

for the fourth foundation brake 104, i.e. the foundation brake acting on the rear right wheel, can be determined according to eq. (10) and (11):

$$u_{max}^{rr} = \min(\text{actuator}_{max}^{rr}, T_{max}^{rr} - u_{max}^{em}/2) \tag{10}$$

$$u_{min}^{rr} = \text{actuator}_{min}^{rr} \tag{11}$$

The inclusion of the upper actuator brake torque limit for the electric machine in eq. (8) and (10) is due to the fact that the electric machine is acting to apply a brake torque on the rear wheels in the exemplified example in FIG. 1.

Hereby, the upper and lower actuator brake torque limits for each of the actuators have been determined. The above described actuator brake torque limits calculated according to eq. (2)-(11) are transmitted to the control allocator 208. The control allocator is hereby configured to determine a vector $$u_d^T$$

which describes torque on each actuator. The following equations can be particularly useful for determining the vector $$u_d^T.$$

Firstly, the control allocator 208 receives a signal indicative of a requested brake torque, $T_{request}$ for the vehicle 100. The desired brake torque for the electric machine 106 can be determined by eq. (12):

$$T_{em} = \min(T_{request}, u_{max}^{em}) \tag{12}$$

The total brake torque for the third and fourth wheels referred to below as $T_{b,r}$, i.e. both the rear left wheel and the rear right wheel, can be determined by eq. (13):

$$T_{b,r} = \max\left(0,\ \min\left(T_{request}\frac{F_{z,r}}{F_{z,r}+F_{z,f}} - T_{em},\ u_{max}^{rl} + u_{max}^{rr}\right)\right) \tag{13}$$

Where $F_{z,f}$ is a wheel axle pressure exposed to a first wheel axle connected to the pair of front wheels, and $F_{z,r}$ is a wheel axle pressure exposed to a second wheel axle connected to the pair of rear wheels. Further, and as can be seen in eq. (13), the capabilities of the electric machine have been taken into account.

The total brake torque for the first and second wheels referred to below as $T_{b,f}$, i.e. both the front left wheel and the front right wheel, can be determined by eq. (14):

$$T_{b,f} = \min\left(T_{request} - T_{em} - T_{b,r},\ u_{max}^{fl} + u_{max}^{fr}\right) \tag{14}$$

In order to ensure that as much as possible of the requested brake torque is distributed between the actuators, an updated total brake torque for the third and fourth wheels referred to below as $T_{b,r,upd}$, i.e. both the rear left wheel and the rear right wheel, can be determined by eq. (15). $T_{b,r,upd}$, is used when the torque request exceeds the desired brake torque for the electric machine and the desired brake torque for each of the first, second, third and fourth foundation brakes.

$$T_{b,r,upd} = \min\left(T_{request} - T_{em} - T_{b,f},\ u_{max}^{rl} + u_{max}^{rr}\right) \tag{15}$$

The control allocator 208 can now set the distributed torques as:

$$u_d^T = \left[\frac{T_{b,f}}{2},\ \frac{T_{b,f}}{2},\ \frac{T_{b,r,upd}}{2},\ \frac{T_{b,r,upd}}{2},\ T_{em}\right]^T \tag{16}$$

As a precautionary measure to ensure that no actuator limit is exceeded, a check is preferably made and if any of the determined torque eq. (16) is exceeding the upper actuator torque limit 228, that specific torque is set to correspond to the upper actuator torque limit 228, while the remaining torque is added to the actuator on the other side of the same wheel axle. To present an example, if the brake torque on the foundation brake 108 of the first wheel exceeds its upper actuator torque limit 228, the remaining torque is added to the foundation brake 108 of the second wheel.

Figure 3:
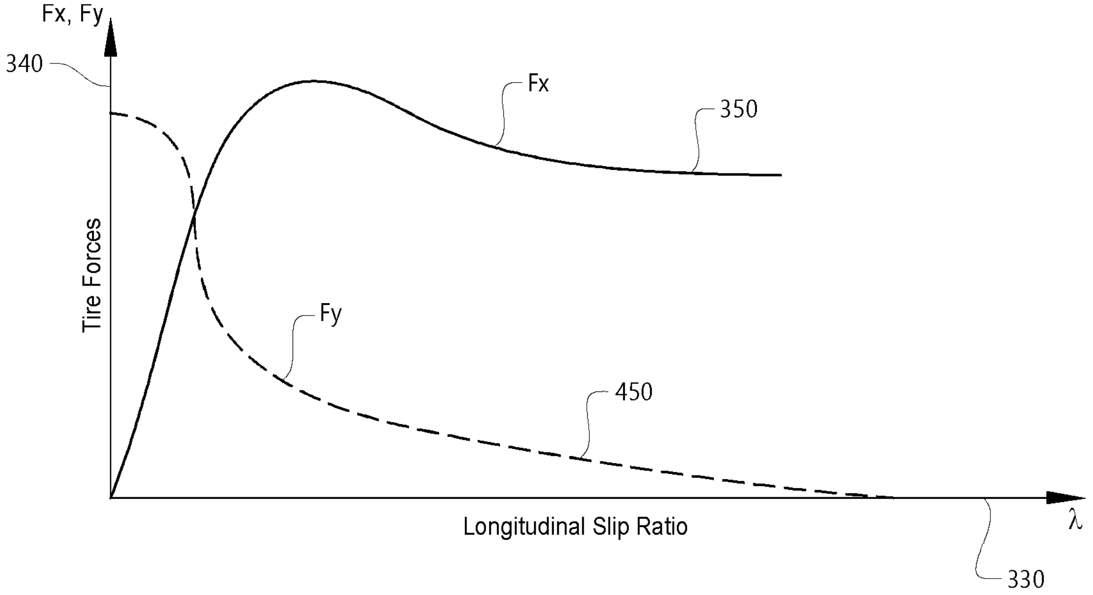
FIG. 3 is a graph illustrating an example embodiment of a model representing a relationship between wheel slip and lateral wheel forces.

Reference is now made to FIG. 3 which is a graph illustrating an example embodiment of a model representing a relationship between wheel slip and lateral wheel forces. Accordingly, the model depicted in FIG. 3 can be used for estimating the above described lateral wheel force 216.

As can be seen, FIG. 3 illustrates a model 350 representing the relationship between the calculated longitudinal wheel slip and the estimated longitudinal wheel force values, while the model 450 represents the relationship between the maximum available lateral wheel forces for a given longitudinal wheel slip. The model 450 can also, for a predetermined lateral slip angle of the tire, represent the achieved lateral wheel force for a given longitudinal wheel slip. The vertical axis 340 represents the tire force generated between the surface supporting the wheel 102 and the wheel, while the horizontal axis 330 represents the longitudinal wheel slip of the wheel 102 according to eq. (17):

$$\lambda = \frac{\omega_w R_w - V_{x,w}}{\max(|\omega_w R_w|,\ |V_{x,w}|)} \tag{17}$$

Where:

$\lambda$ is the wheel slip for the wheel;

$\omega_w$ is the rotational velocity of the wheel;

$R_w$ is the wheel radius; and $V_{x,w}$ is the longitudinal wheel speed of the wheel.

The lateral force acting on the wheel can hereby be determined by calculating the wheel slip and using the model in FIG. 3.

Figure 4:
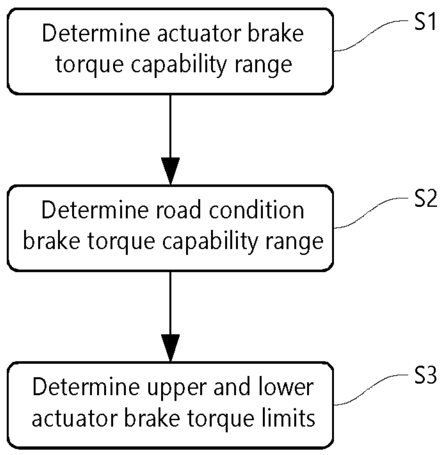
FIG. 4 is a flow chart of a method for determining actuator brake torque limits according to an example embodiment.

In order to sum up, reference is now made to FIG. 4 which is a flow chart of a method of determining actuator brake torque limits for the above described plurality of actuators 104. During operation of the vehicle 100, an actuator brake torque capability range is determined S1. As described above, the actuator brake torque capability range is based on the above described actuator specific torque capacity and the current operational state of the actuator. Also, the road condition brake torque capability range is determined S2. As also described above, the road condition brake torque capability range is based on the estimated lateral wheel force 216 acting on the wheel 102, an estimated friction 218 between the tire surface of the wheel 102 and the road surface, and a vertical wheel force 220 acting on the wheel. The road condition brake torque capability range is also preferably based on the wheel radius 222 of the wheel. The actuator brake torque capability range as well as the road condition brake torque capability range are transmitted to the actuator limit module 206 whereby an upper 228 and a lower 230 actuator brake torque limit is determined S3 for each of the plurality of actuators 104 based on the actuator brake torque capability range and the road condition brake torque capability range.

It is to be understood that the present disclosure is not limited to the embodiments described above and illustrated in the drawings; rather, the skilled person will recognize that many changes and modifications may be made within the scope of the appended claims.

The invention claimed is:

1. A method of determining actuator brake torque limits for a plurality of actuators, wherein each actuator is operable to apply a brake torque on a wheel of a vehicle, the method comprising:

determining, for each actuator, an actuator brake torque capability range based on an actuator specific torque capacity and a current operational state of the actuator;

determining, for each wheel of the vehicle, a road condition brake torque capability range based on an estimated lateral wheel force acting on the wheel, an estimated friction between a tire surface of the wheel and a road surface, and a vertical wheel force acting on the wheel; and determining, for each actuator, an upper actuator brake torque limit and a lower actuator brake torque limit based on the actuator brake torque capability range and the road condition brake torque capability range; and operating each actuator within the upper actuator brake torque limit and the lower actuator brake torque limit.

2. The method of claim 1, wherein the current operational state of the actuator is a brake torque level currently applied by the actuator.

3. The method of claim 1, the method further comprising:

determining, for each wheel of the vehicle, a wheel slip value; and estimating the lateral wheel force based on a mapping model defining a relationship between wheel slip and lateral wheel force.

4. The method of claim 1, wherein the road condition brake torque capability range is further based on a wheel radius of the wheel.

5. The method of claim 1, wherein the plurality of actuators comprises a first foundation brake operable to apply a brake torque on a first wheel, a second foundation brake operable to apply a brake torque on a second wheel, a third foundation brake operable to apply a brake torque on a third wheel, a fourth foundation brake operable to apply a brake torque on a fourth wheel, and an electric machine operable to apply a brake torque on the third and fourth wheels.

6. The method of claim 5, wherein the electric machine is connected to the third and fourth wheel via differential coupling.

7. The method of claim 5, wherein the upper actuator brake torque limit for each of the first and second foundation brakes is a minimum of:

an upper limit of the actuator brake torque capability range and an upper limit of the road condition brake torque capability range; and wherein the lower actuator brake torque limit for each of the first and second foundation brakes is a lower limit of the actuator brake torque capability range.

8. The method of claim 5, wherein the upper actuator brake torque limit for the electric machine is a minimum of:

an upper limit of the actuator brake torque capability range; and a brake torque corresponding to twice of the lowest one of:

the upper limit of the road condition brake torque capability range for the third and fourth wheels; and wherein the lower actuator brake torque limit for the electric machine is a lower limit of the actuator brake torque capability range.

9. The method of claim 8, wherein the upper actuator brake torque limit for each of the third and fourth foundation brakes is a minimum of:

an upper limit of the actuator brake torque capability range and an upper limit of the road condition brake torque capability range minus the upper actuator brake torque limit for the electric machine; and wherein the lower actuator brake torque limit for each of the third and fourth foundation brakes is a lower limit of the actuator brake torque capability range.

10. The method of claim 8, further comprising:

receiving a signal indicative of a requested brake torque for decelerating the vehicle; and determining a desired brake torque for the electric machine as a minimum of the requested brake torque and the upper actuator brake torque limit for the electric machine.

11. The method of claim 10, further comprising:

determining a desired brake torque for each of the third and fourth foundation brakes based on the requested torque, the desired brake torque of the electric machine and the upper actuator brake torque limit for each of the third and fourth foundation brakes.

12. The method of claim 11, further comprising:

determining a desired brake torque for each of the first and second foundation brakes based on the requested torque, the desired brake torque of the electric machine, the desired brake torque for each of the third and fourth foundation brakes and upper actuator brake torque limit for each of the first and second foundation brakes.

13. The method of claim 11, further comprising:

determining a first wheel axle pressure level exposed to a first wheel axle connected to the first and second wheels;

determining a second wheel axle pressure level exposed to a second wheel axle connected to the third and fourth wheels; and determining the desired brake torque for each of the first and second foundation brakes also based on a pressure ratio between the first and second wheel axle pressure levels.

14. The method of claim 13, further comprising:

comparing the torque request with the desired brake torque for the electric machine and the desired brake torque for each of the first, second, third and fourth foundation brakes, and when the torque request exceeds the desired brake torque for the electric machine and the desired brake torque for each of the first, second, third and fourth foundation brakes:

determining an updated desired brake torque for each of the third and fourth foundation brakes based on the requested torque, the desired brake torque of the electric machine, the desired brake torque for each of the first and second foundation brakes, and the upper actuator brake torque limit for each of the third and fourth foundation brakes.

15. A computer program comprising program code means for performing the steps of claim 1 when the program is run on a computer.

16. A computer readable medium carrying a computer program comprising program means for performing the steps of claim 1 when the program means is run on a computer.

17. A vehicle motion management system for a vehicle, the vehicle motion management system being connectable to a plurality of actuators operable to apply a brake torque on a wheel of a vehicle, the vehicle motion management system comprising processing circuitry configured to:

determine, for each actuator, an actuator brake torque capability range based on an actuator specific torque capacity and a current operational state of the actuator;

determine, for each wheel of the vehicle, a road condition brake torque capability range based on an estimated lateral wheel force acting on the wheel, an estimated friction between a tire surface of the wheel and a road surface, and a vertical wheel force acting on the wheel; and determine, for each actuator, an upper actuator brake torque limit and a lower actuator brake torque limit based on the actuator brake torque capability range and the road condition brake torque capability range; and operate each actuator within the upper actuator brake torque limit and the lower actuator brake torque limit.

* * * * *